US008909702B2

(12) United States Patent
Golovchinsky et al.

(10) Patent No.: US 8,909,702 B2
(45) Date of Patent: Dec. 9, 2014

(54) SYSTEM AND METHOD FOR COORDINATION OF DEVICES IN A PRESENTATION ENVIRONMENT

(75) Inventors: Gene Golovchinsky, Menlo Park, CA (US); John Steven Boreczky, San Leandro, CA (US); William J. van Melle, Los Altos, CA (US); Maribeth Joy Back, Woodside, CA (US); Anthony Eric Dunnigan, Berkeley, CA (US); Pernilla Qvarfordt, Los Altos, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1049 days.

(21) Appl. No.: 11/855,973

(22) Filed: Sep. 14, 2007

(65) Prior Publication Data

US 2008/0183820 A1     Jul. 31, 2008

Related U.S. Application Data

(60) Provisional application No. 60/887,115, filed on Jan. 29, 2007.

(51) Int. Cl.
| | | |
|---|---|---|
| *G06F 15/16* | (2006.01) | |
| *H04N 7/14* | (2006.01) | |
| *G06Q 10/10* | (2012.01) | |
| *G06F 21/71* | (2013.01) | |
| *H04L 29/08* | (2006.01) | |
| *H04L 12/28* | (2006.01) | |
| *H04L 12/18* | (2006.01) | |
| *H04L 29/06* | (2006.01) | |
| *H04N 7/15* | (2006.01) | |

(52) U.S. Cl.
CPC .......... *H04L 67/125* (2013.01); *H04L 63/0853* (2013.01); *G06Q 10/109* (2013.01); *H04N 7/15* (2013.01); *G06F 21/71* (2013.01); *H04L 12/2829* (2013.01); *H04L 12/1822* (2013.01)
USPC ....................................... 709/204; 348/14.08

(58) Field of Classification Search
CPC ............. H04L 67/125; H04L 12/1822; H04L 12/2829; H04L 63/0853; H04N 7/15; G06F 21/71; G06Q 10/109
USPC ....................................... 709/204; 348/14.08
See application file for complete search history.

(56) References Cited

U.S. PATENT DOCUMENTS

| 5,999,208 | A | * | 12/1999 | McNerney et al. | ........ | 348/14.08 |
| 6,285,392 | B1 | * | 9/2001 | Satoda et al. | .............. | 348/14.09 |

(Continued)

OTHER PUBLICATIONS

Al-Muhtadi, J. et al., "Cerberus: a context-aware security scheme for smart spaces," Pervasive Computing and Communications, 2003. (PerCom 2003). Proceedings of the First IEEE International Conference on , vol., no., pp. 489-496, Mar. 23-26, 2003. <URL: http://ieeexplore.ieee.org/stamp/stamp.jsp?tp=&arnumber=1192774&isnumber=26747>.*

(Continued)

*Primary Examiner* — Rupal Dharia
*Assistant Examiner* — Wing Ma
(74) *Attorney, Agent, or Firm* — Morgan, Lewis & Bockius LLP

(57) ABSTRACT

A system is provided that coordinates the operation of hardware devices and software applications in support of specific tasks such as holding a meeting. The system includes one or more computers connected by a network, at least one configuration repository component, at least one room control component, and one or more devices and applications for each room control component. Meeting presenters can configure a meeting, or they may use a default configuration. A meeting includes one or more presenters' configurations of devices and applications to accommodate multiple presenters simultaneously. The meeting configurations are stored by the configuration repository component. Each presenter's configuration comprises a subset of the one or more devices and applications. The operation of devices and applications in the meeting is coordinated by the room control component based on the presenters' configurations for the meeting.

26 Claims, 4 Drawing Sheets

(56) References Cited

U.S. PATENT DOCUMENTS

| | | | |
|---|---|---|---|
| 6,288,716 B1* | 9/2001 | Humpleman et al. | 715/733 |
| 6,330,022 B1* | 12/2001 | Seligmann | 348/14.08 |
| 6,414,707 B1* | 7/2002 | Agraharam et al. | 348/14.07 |
| 6,421,721 B1* | 7/2002 | Dadsetan et al. | 709/224 |
| 6,614,451 B1* | 9/2003 | Hudson et al. | 715/759 |
| 6,629,129 B1* | 9/2003 | Bookspan et al. | 709/204 |
| 6,862,529 B2* | 3/2005 | Brown et al. | 702/3 |
| 6,885,362 B2* | 4/2005 | Suomela | 345/156 |
| 7,016,935 B2* | 3/2006 | Lee et al. | 709/204 |
| 7,047,279 B1* | 5/2006 | Beams et al. | 709/204 |
| 7,248,231 B2* | 7/2007 | Hurley et al. | 345/2.1 |
| 7,316,016 B2* | 1/2008 | DiFalco | 718/102 |
| 7,430,721 B2* | 9/2008 | Johanson et al. | 715/761 |
| 7,542,068 B2* | 6/2009 | Eshkoli et al. | 348/14.08 |
| 7,546,343 B2* | 6/2009 | Benco et al. | 709/204 |
| 7,558,823 B2* | 7/2009 | Beers et al. | 709/205 |
| 7,577,682 B2* | 8/2009 | Mueller et al. | 1/1 |
| 7,606,560 B2* | 10/2009 | Labrou et al. | 455/411 |
| 7,673,244 B2* | 3/2010 | Zukowski et al. | 715/744 |
| 2002/0095586 A1* | 7/2002 | Doyle et al. | 713/186 |
| 2003/0084197 A1* | 5/2003 | Hill et al. | 709/315 |
| 2003/0103075 A1* | 6/2003 | Rosselot | 345/173 |
| 2003/0208536 A9* | 11/2003 | Lee et al. | 709/204 |
| 2003/0224807 A1* | 12/2003 | Sinha et al. | 455/463 |
| 2004/0243663 A1* | 12/2004 | Johanson et al. | 709/200 |
| 2005/0044384 A1* | 2/2005 | Kimura | 713/183 |
| 2005/0050061 A1* | 3/2005 | Karstens | 707/100 |
| 2005/0065951 A1* | 3/2005 | Liston et al. | 707/101 |
| 2005/0245264 A1* | 11/2005 | Laroia et al. | 455/445 |
| 2006/0242584 A1* | 10/2006 | Johanson et al. | 715/738 |
| 2007/0188595 A1* | 8/2007 | Ferren et al. | 348/14.08 |
| 2008/0097624 A1* | 4/2008 | Weatherhead et al. | 700/9 |
| 2008/0134204 A1* | 6/2008 | Cho et al. | 719/314 |
| 2009/0307748 A1* | 12/2009 | Blom et al. | 726/2 |

OTHER PUBLICATIONS

Fox, A; Johanson, B.; Hanrahan, P.; Winograd, T., "Integrating information appliances into an interactive workspace," Computer Graphics and Applications, IEEE, vol. 20, No. 3, pp. 54,65, May-Jun. 2000. <URL: http://ieeexplore.ieee.org/stamp/stamp.jsp?tp=&arnumber=844373&isnumber=18308>.*

Mayrhofer, R., "Towards an Open Source Toolkit for Ubiquitous Device Authentication," Pervasive Computing and Communications Workshops, 2007. PerCom Workshops '07. Fifth Annual IEEE International Conference on , vol., no., pp. 247,254, Mar. 19-23, 2007. <URL: http://ieeexplore.ieee.org/stamp/stamp.jsp?tp=&arnumber=4144834&isnumber=4144775>.*

Xiaohang Wang; Dong, J.S.; Chin, C.Y.; Hettiarachchi, S.R.; Zhang, D., "Semantic Space: an infrastructure for smart spaces," Pervasive Computing, IEEE , vol. 3, No. 3, pp. 32,39, Jul.-Sep. 2004. <URL: http://ieeexplore.ieee.org/stamp/stamp.jsp?tp=&arnumber=1321026&isnumber=29257>.*

Darses, Francoise, et al. (Eds.), "Cooperative Systems Design: Scenario-Based Design of Collaborative Systems," IOS Press, Amsterdam, pp. 99-114 (2004).

Schmidt, Albrecht, "Ubiquitous Computing—Computing in Context," Doctoral Dissertation, Computing Department, Lancaster University, U.K., 312 pages (Nov. 2002).

Westman, Tommy, "The Spot system: A prototype of an affordable location awareness system using a user-centered semantic, subjective and symbolic location model," master thesis, Department of Computer and Systems Science, Stockholm University/Royal Institute of Technology, 100 pages (Oct. 2005).

Abowd, Gregory D., et al., "Living Laboratories: The Future Computing Environments Group at the Georgia Institute of Technology," CHI '00, downloaded from http://www.awarehome.gatech.edu/publications/livinglabs-chi2000.pdf on Sep. 13, 2007, at http://www.webcitation.org/5Rpf3uurr, 2 pages (2000).

Ballagas, Rafael, et al., "Patch Panel: Enabling Control-Flow Interoperability in Ubicomp Environments," PerCom 2004, downloaded from http://iwork.stanford.edu/pubs/patchpanel-percom04.pdf on Sep. 13, 2007, at http://www.webcitation.org/5RpfPNR4Q, 12 pages (Mar. 2004).

Coen, Michael H., et al., "Meeting the Computational Needs of Intelligent Environments," MANSE, Dublin, Ireland, 12 pages (Dec. 1999).

Fersha, Alois, et al., "Workshop on Ubiquitous Display Environments," Proc. Ubicomp 2004, Nottingham, England, 2 pages (Sep. 7, 2000).

Hanssens, Nicholas, et al., "Building Agent-Based Intelligent Workspaces," ABA Conference Proceedings, downloaded from http://www.isi.edu/~pipet/pub/hanssens-aba02.pdf on Sep. 13, 2007, at http://www.webcitation.org/5RpffsiC8, 7 pages (Jun. 2002).

Hjelm, Lowe, et al., "State and Session Handling in Interactive Rooms," KTH&SU, DSV-TR:2005-019, downloaded from http://www.dsv.su.se/fuse/fasade/state_and_session_handling.pdf on Sep. 13, 2007, at http://www.webcitation.org/5RpftJBqc, 6 pages (2005).

Hope, Tom, et al. "Doing Community: Co-Construction of Meaning and Use with Interactive Information Kiosks," Proc. Ubicomp2006, downloaded from http://ymatsuo.com/papers/ubicomp2006hope.pdf on Sep. 13, 2007, at http://www.webcitation.org/5RpgFq4sk, 18 pages (2006).

Ionescu, Arna, et al., "Workspace Navigator: Tools for Capture, Recall and Reuse Using Spatial Cues in an Interactive Workspace," Stanford Technical Report TR2002-04, downloaded from http://hci.stanford.edu/research/wkspcNavTR.pdf on Sep. 13, 2007, at http://www.webcitation.org/5RphGZ882, 16 pages (2002).

Johanson, Brad, et al., "PointRight: Experience with Flexible Input Redirection in Interactive Workspaces," UIST 2002, Paris, France, downloaded from http://www-graphics.stanford.edu/papers/pointright-uist2002/pointright-uist02.pdf on Sep. 13, 2007, at http://www.webcitation.org/5RphM8YYe, 8 pages (2002).

Jonsson, Martin, et al., "Building Extendable Room Based Sensor Clusters for Ubiquitous Computing Environments," KTH&SU DSV-TR:2002-019, downloaded from http://www.dsv.su.se/FEEL/ALL/Sensor%20clusters.pdf on Sep. 13, 2007, at http://www.webcitation.org/5RphRpVCi, 8 pages (2002).

Liu, Qiong, et al., "An EPIC Enhanced Meeting Environment," Proc. of ACM Multimedia 2004, pp. 940-941 (Oct. 10-16, 2004).

Román, Manuel, et al., "Gaia: A Middleware Infrasturcture to Enable Active Spaces," IEEE Pervasive Computing, downloaded from http://www.tecgraf.puc-rio.br/publications/artigo_2002_gaia_middleware_infrastructure.pdf on Sep. 13, 2007, at http://www.webcitation.org/5Rphu1f0U, 16 pages (Oct.-Dec. 2002).

Schilit, Bill N., et al., "Context-Aware Computing Applications," IEEE Workshop on Mobile Computing Systems and Applications, downloaded from http://www.webcitation.org/5RpjdK4zE on Sep. 13, 2007, at http://www.webcitation.org/5RpjdK4zE, pp. 1-7 (1994).

Shirehjini, Ali Nazari, "A Generic UPnP Architecture for Aml Meeting Rooms and a Control Point Allowing for Integrated 2D and 3D Interaction," Proc. Smart Objects & Ambient Intelligence (sOc-EUSAI 2005), Grenoble, France, 9 pages (Oct. 12-14, 2005).

Sousa, João Pedro, et al., "Aura: An Architectural Framework for User Mobility in Ubiquitous Computing Environments," Software Architecture: System Design, Development and Maintenance, Proceedings of the 3$^{rd}$ Working IEEE/IFIP Conference on Software Architecture, 14 pages (Aug. 25-31, 2002).

Ullmer, B., et al., "Emerging Frameworks for Tangible User Interfaces," IBM Systems Journal, vol. 39, Nos. 3 & 4, pp. 915-931 (2000).

Werle, Patrik, et al., "A Ubiquitous Service Environment with Active Documents for Teamwork Support," Proceedings of UBICOMP 2001, downloaded from http://www.dsv.su.se/fuse/publications/fuseONE.pdf on Sep. 13, 2007, at http://www.webcitation.org/5Rpi8UFeG, 17 pages (2001).

Back, The USE Project: designing smart spaces for real people, Proc. of Ubicomp 2006 Workshop, Sep. 17, 2006, 1 pg.

Notice of Reasons for Rejection, Japanese Patent Application 2008-018350, Apr. 18, 2012, 2 pgs.

* cited by examiner

SYSTEM AND METHOD FOR COORDINATION OF DEVICES IN A PRESENTATION ENVIRONMENT

CLAIM OF PRIORITY

The present application claims priority to U.S. Provisional Patent Application No. 60/887,115, entitled "DEVICE ORCHESTRATION," by Gene Golovchinsky, et al., filed Jan. 29, 2007, which is incorporated by reference herein in its entirety.

CROSS-REFERENCE TO RELATED APPLICATIONS

The present application is related to the following U.S. patent application Ser. No. 11/780,384 entitled "DESIGN AND DESIGN METHODOLOGY FOR CREATING AN EASY-TO-USE-CONFERENCE ROOM SYSTEM CONTROLLER" by Maribeth Joy Back et al., filed Jul. 19, 2007, which application is assigned to the owner of the present invention, and which application is incorporated by reference herein in its entirety.

BACKGROUND OF THE INVENTION

1. Field of the Invention

The present invention relates to the coordination of multiple devices based on user configurations for conference rooms.

2. Description of the Related Art

Technology-rich environments such as conference rooms are often difficult to use because the various components in them do not interoperate cleanly, are often unaware of each other, and require separate control. It is difficult for casual users to coordinate the use of such devices to perform specific tasks such as holding a teleconference.

Ubiquitous computing ("ubicomp") is one methodology for providing a technology-rich environment such as a conference room. Ubicomp integrates computation into the environment, rather than having computers which are distinct objects. Other terms for ubicomp include pervasive computing, calm technology, "things that think," and everyware. Ubicomp focuses on embedding computation into the environment and everyday objects to enable people to interact with information-processing devices more naturally and casually than they currently do, and in whatever location or circumstance they find themselves.

In a sense, however, ubicomp is an oxymoron. In particular, in "smart" conference rooms, applications of ubicomp technologies have generally been far from user-friendly. Current research in high-end room systems often focuses on a multiplicity of thin, bright display screens both large and small, along with interactive whiteboards, robotic cameras, and remote conferencing systems with rich media handling capabilities. Rich media is information that consists of any combination of graphics, audio, video and animation, which is more storage and bandwidth intensive than ordinary text. Exploiting all these technologies in one room, however, is a daunting task. Faced with three or more display screens, most presenters opt for simply replicating the same image on all the screens. Even more daunting is the design challenge of how to choose which room functions performed by machines are vital to particular tasks that different users want to perform, which room functions are vital to a particular room, and which room functions are well suited to a particular culture. For a particular room example, a room function of teleconferencing is more likely to be vital to a small conference room design than to a large conference room design. For an example regarding culture, designs might be different for conference rooms in Japan versus those in the United States. In Japan, business meetings are generally scripted and closely follow an agenda. These meetings might be followed by a brainstorming session. In the United States, however, business meetings are commonly brainstorming sessions. A Japanese conference room design might focus on Power Point slides, whereas a United States conference room design might focus on interactive whiteboards.

Maintenance is another issue. Nearly all smart rooms have resident staff who keep the rooms' systems functioning, and who often must be available on an everyday basis just to enable users to use the rooms. The systems in these rooms are designed for and assume the presence of these human "wizards." These systems are seldom designed with users' activities in mind. In addition, users do not know what to expect in these rooms because there is no technology standard for next-generation conference rooms.

In general, it would be beneficial to provide improvements to conference room system designs. In particular, it would be beneficial to provide these improvements in smart room environments.

SUMMARY OF THE INVENTION

A system is provided that coordinates the operation of hardware devices and software applications in support of specific tasks such as holding a meeting. The system includes one or more computers connected by a network, at least one configuration repository component, at least one room control component, and one or more devices and applications for each room control component. Meeting presenters can configure a meeting, or they may use a default configuration. A meeting includes one or more presenters' configurations of devices and applications to accommodate multiple presenters simultaneously. The meeting configurations are stored by the configuration repository component. Each presenter's configuration comprises a subset of the one or more devices and applications. The operation of devices and applications in the meeting is coordinated by the room control component based on the presenters' configurations for the meeting.

BRIEF DESCRIPTION OF THE DRAWINGS

Preferred embodiments of the present invention will be described in detail based on the following figures, wherein.

DETAILED DESCRIPTION OF THE INVENTION

Figure 1:
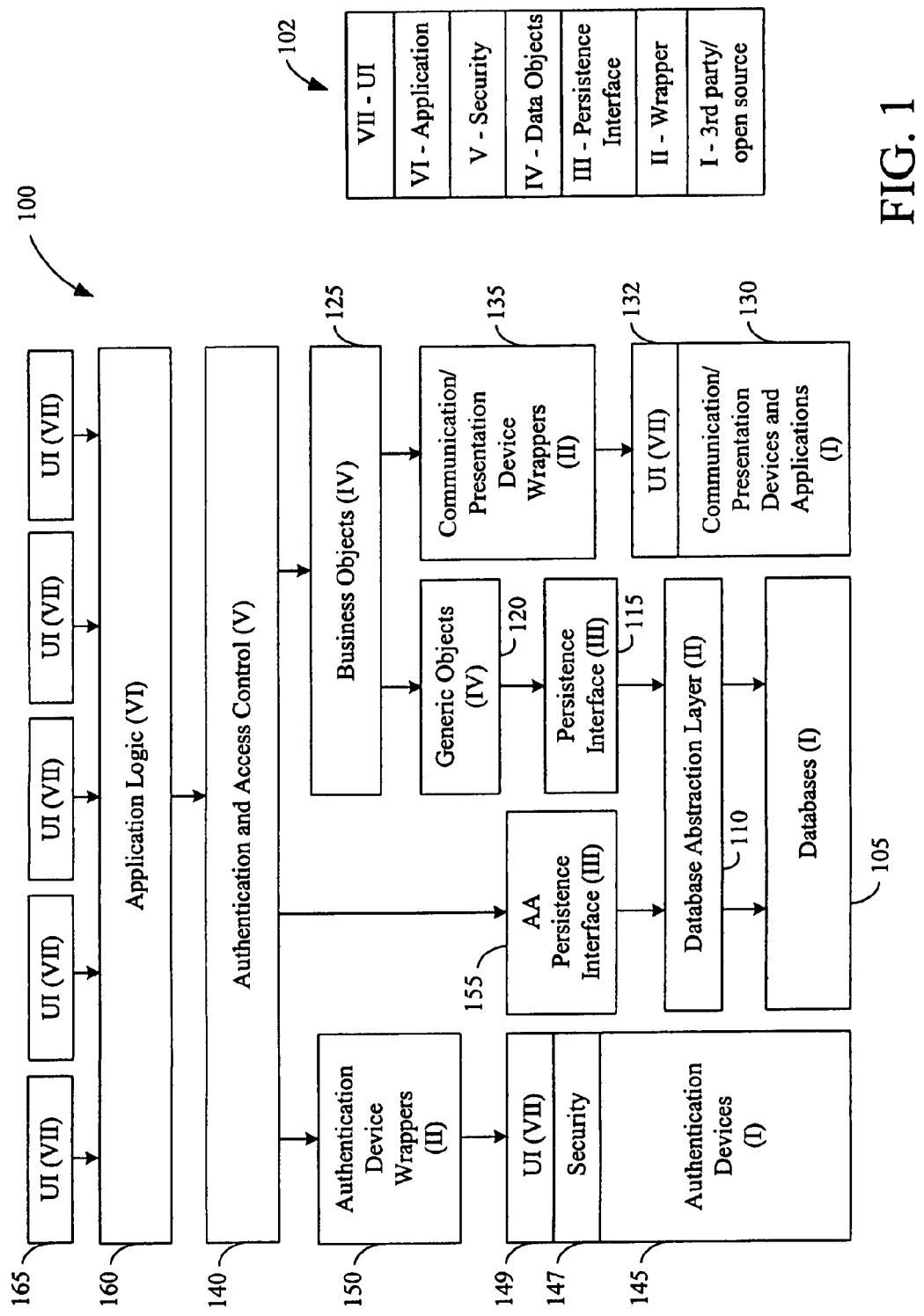
FIG. 1 illustrates an example of the system software architecture shown as a stack of components, according to embodiments of the present invention.

The present invention includes a flexible, extensible architecture for orchestrating the behavior of devices on behalf of a user based on configurations created for specific situations. These situations include smart environments, particularly for conference rooms or classrooms. In a conference room setting, the system can coordinate the use of projectors, computer displays, and teleconferencing systems to support a video conference with shared documents. Multiple devices are coordinated based on a given configuration to put each device into an appropriate state for a specific user task. A user can exercise control over the system by selecting task-oriented actions, while the system performs the required device orchestration to perform the tasks.

The system includes several components: a configuration repository, one or more orchestration components for each physical space that needs to be controlled, an optional user console for each space, and for each physical space one or more devices to be controlled. The system architecture includes a database that stores information about devices, rooms, people, and meetings. System software implements a prototype-instance inheritance mechanism through which contextual information, for example IP addresses, application settings, and telephone numbers for teleconferencing systems, can he associated with specific devices for specific users, rooms, and meetings.

The system architecture is extensible because it supports dynamic plug-and-play device capability, unlike canned room control environments that are designed to work with specific sets of devices. Devices can be swapped out without rebooting the system or affecting existing configurations. New devices can be introduced without requiring any software code changes in the existing orchestration framework. Thus, the system software does not have to be rebuilt to accommodate new devices added to the conference room setting.

The orchestration of devices removes the need to manage multiple devices independently, thus improving the usefulness and usability of conference rooms. The present invention can integrate existing complex devices such as video switchers, video conferencing systems, and applications rather than "primitives" such as joysticks and buttons. No dedicated remote control devices are required to operate the entire system.

The system is predictable and can be controllable by the user. The present invention can focus on short-term meeting support, rather than on long-running tasks that can be moved from one location to another. For example, if a projector is turned off, when a meeting starts, the system of the present invention turns it on, rather than the less desirable re-routing of the display to another projector. The need for online support staff to operate the spaces is reduced, system setup and maintenance time is reduced, and the number of expert users required to configure and manipulate the equipment is reduced.

I. System Software Architecture

FIG. 1 illustrates an example of the system software architecture shown as a stack of components, according to embodiments of the present invention. This stack of components for system software 100 can be grouped together in seven example layers, and these layers are shown in box 102. Layer 1 includes third party and open source devices and applications. Layers II, III, and IV include wrappers, persistence interfaces, and data objects, respectively. Layers V, VI, and VII include security, application, and user interface layers, respectively. In FIG. 1, the layer to which each component belongs is shown in parentheses after the component name. Starting at the bottom layer of components, devices and applications layer I includes authentication devices 145, databases 105, and communication/presentation devices 130. Wrappers layer II includes authentication device wrappers 150, database abstraction layer 110, and communication/presentation device wrappers 135. Persistence interfaces layer III includes authentication and access (AA) persistence interface or AA persistence interface 155 and persistence interface 115. Data objects layer IV includes generic objects 120 and business objects 125. Security layer V includes authentication and access control 140, as well as authentication devices 147 that generate authentication requests, shown as security 147. Application layer VI includes application logic 160, and user interface layer VII includes user interfaces (UIs) 165, as well as UIs of authentication devices 145 and UIs of communication/presentation devices 130.

The system contains one or more databases 105 for storing configurations and authentication information. Examples of these databases include, but are not limited to, MySQL and Oracle relational databases. These databases 105 are wrapped by database abstraction layers 110 that manage database access and make the rest of the system software 100, such as application logic 160, independent from the particular choice, or brand, of databases 105. In other words, the database abstraction layer 110 knows about different types of databases, and exposes the same interface to its clients regardless of the choice of database used. In addition, the persistence interface 115 makes it possible to manipulate database records as first class objects, further isolating persistent storage details from the system software 100 for persistent data that exists from session to session. The persistence interface 115 transparently associates objects in memory with records in the databases 105. It reads the databases 105 to create objects and stores objects into the databases 105. When the system software 100 uses the databases, the database abstraction layer 110 and persistence interface layer 115 collaborate together to store the appropriate data in memory. The databases 105, database abstraction layer 110, and persistence interface 115 can be any third party software, or commercial software, as well as open source software.

The generic objects component 120 represents the schema of the objects stored in the databases 105. These objects include objects for meetings, rooms, configurations, creators of meetings, devices, and device states, as well as associated attributes. These objects are described more fully below in connection with FIG. 2. The database abstraction layer 110, persistence layer 115, and generic objects 120 represent data in the databases 105, but do not perform meeting-specific functions.

The business objects component 125, on the other hand, contains objects that directly control the various communication/presentation devices and applications 130 that make up an instance of the system software 100. Examples of communication/presentation devices and applications include, but are not limited to, Tandberg, and Sony PCS1 video conferencing systems. Business objects 125 are IDevice objects created by the RoomControl component located on the room control PC 315, details of which are provided in the discussion related to FIG. 3. A collection of device states from the generic objects 120 is passed to the business objects layer 125, where they are transformed into a new collection of IDevice objects that know how to perform behavior to run a meeting. The communication/presentation device wrappers 135 manage device and application access and make the rest of the system software 100, such as application logic 160, independent from the particular choices, including types and brands, of devices and applications 130. For example, for two different video conferencing devices, the actual commands sent to turn on/off or dial each device may be different, but the fact they have capability to dial and connect/disconnect is what is important. The communications/presentation device wrappers 135 provide extensibility because devices and applications 130 can be loaded dynamically without rebooting the system or affecting existing configurations.

Authentication and access control is performed by the security component shown generally at 140, or authentication and access control. This software component includes authenticating users who want to sign in, generating session tokens for signed-in users, distributing these session tokens to other components of the system software 100, and validating session tokens on request. This component maintains user accounts but can use Windows Domain authentication to authenticate users, unless the login credentials do not correspond to a Windows domain login. Thus, this component allows both domain users and remote users to use the system software 100. In addition, trusted authentication devices 145 can be used to generate authentication requests. These authentication requests are shown as security 147. Examples of authentication devices include, but are not limited to, hardware such as FeliCa readers that perform radio frequency identification (RFID) of a user's badge, as well as user biometric readers.

The authentication device wrappers 150 manage authentication device access and make the rest of the system software 100, such as application logic 160, independent from the particular choice, including type or brand, of authentication device. The authentication device wrappers 150 provide uniform access to a variety of authentication devices 145.

In addition, an authentication and access persistence interface, or AA persistence interface 155 makes it possible to manipulate database records associated with authenticating users and granting them access as first class objects, further isolating persistent storage details from the rest of the system software 100, such as application logic 160.

Application logic 160 corresponds to the network of distributed components that deliver the appropriate configuration information to the right room at the right time and that orchestrate the meetings. The application logic 160 communicates with the console that enables the user to use the system.

Finally, multiple user interfaces (UIs) 165, such as a meeting console and a configuration editor, allow users to create, modify, and use the information stored in the system software 100. Multiple users can connect to the system in parallel through these UIs 165. Further, UIs 132 allow users to interface with communication/presentation devices and applications 130, and UIs 149 allow users to interface with authentication devices 145. A more detailed description of UIs 165 is described and illustrated in "DESIGN AND DESIGN METHODOLOGY FOR CREATING AN EASY-TO-USE-CONFERENCE ROOM SYSTEM CONTROLLER," incorporated by reference above.

II. Database Schema

Figure 2:
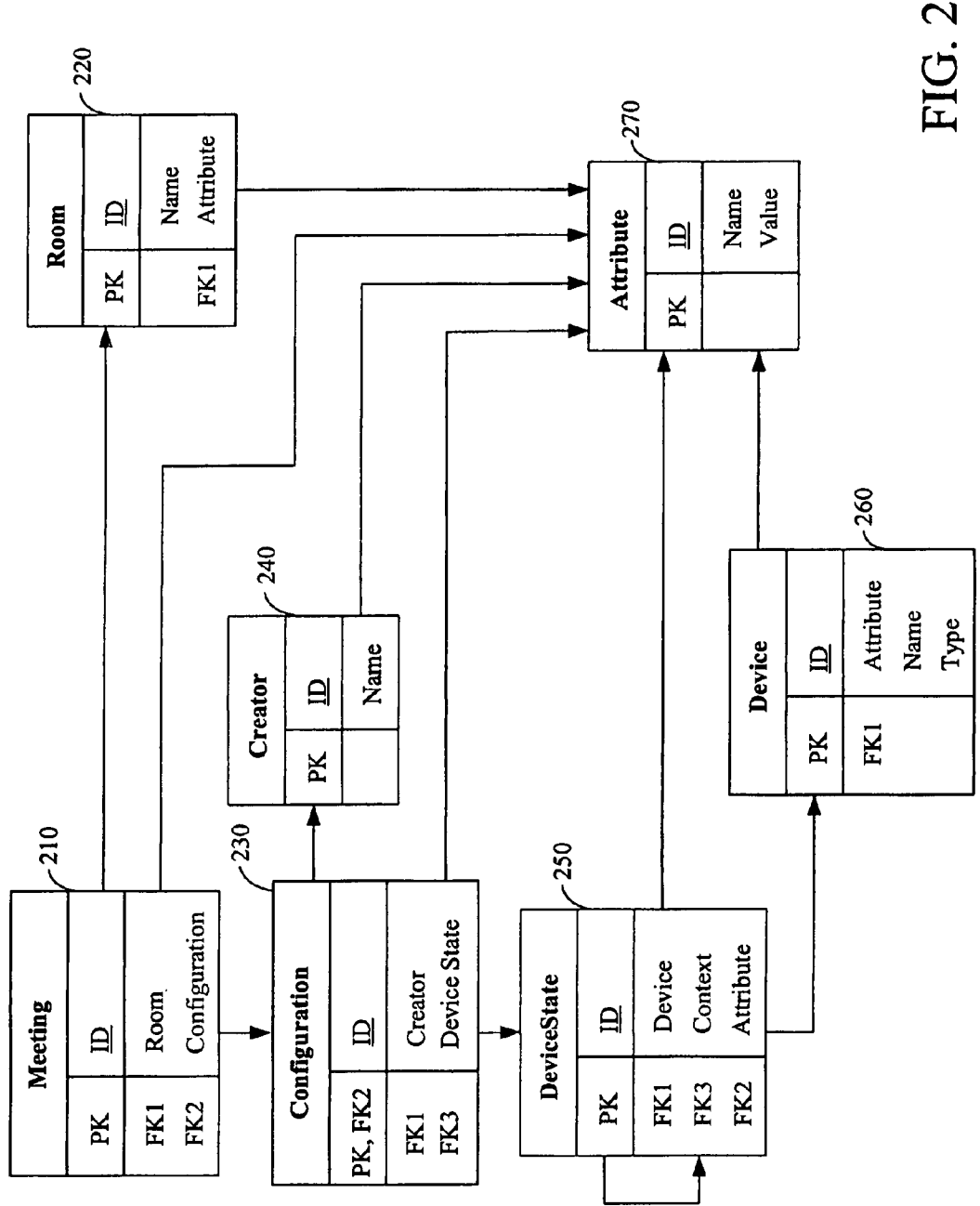
FIG. 2 illustrates an example diagram of the FIG. 1 generic objects component, which represents the schema of the objects stored in the databases, according to embodiments of the invention.

FIG. 2 illustrates an example diagram of the FIG. 1 generic objects component 120, which represents the schema of the objects stored in the databases 105, according to embodiments of the present invention. The database schema organizes database objects in the following manner. Each object has a unique identification (ID), each object includes zero or more properties that are stored as fields in a table, and each object can be associated with any number of attributes. The types of objects are meeting 210, room 220, configuration 230, creator 240, device state 250, device 260, and attribute 270. Each object contains a primary key, shown as PK in each object, and which is the ID of the object. Each object can contain one or more foreign keys as well, shown as FK1, FK2, and FK3 in various objects of FIG. 2. These foreign keys are pointers to other objects.

Each meeting is associated with one room. Each meeting that is configured has a record in a meeting table 210. Each physical space, such as a conference room, is represented by a record in a room table 220. Additionally, each meeting can be associated with one or more configurations to accommodate multiple presenters simultaneously. Each meeting presenter using the system has a corresponding record in a creator table 240. For a meeting table 210, FK1 is a pointer to a room table 220, and FK2 is a pointer to a configuration table 230.

Each configuration in a meeting has a person, or creator, who owns it. Each configuration is a collection of one or more device states and has a corresponding record in a configuration table 230. For configuration table 230, FK1 is a pointer to a creator table 240, FK2 is a pointer to another record in the configuration table 230 that allows a configuration to inherit from another configuration, and FK3 is a pointer to a device state table 250.

Each device is associated with one or more device states. Each physical device type and application type has a corresponding record in a device table 260, and each device state has a record in a device state table 250. For a device state table 250, FK1 is a pointer to a device table 260. Additionally, FK3 is a pointer to the root table to provide more context for the object. Thus, each device state object stored in table 250 can serve as a prototype for other device states. For example, a first device state object points to a second device state object 250. This second object could then point to a third object, and so on, using a prototype-instance notion of inheritance. Each additional device state object stored in table 250 can have additional attributes, an example of which is discussed in relation to FIG. 4.

Each type of object, other than the attribute object 270, can have zero or more arbitrary attributes, although only room object 220, device state object 250, and device object 260 show these attributes in FIG. 2. Attributes for these objects are stored in attribute objects 270. Values are stored in the attributes objects 270, and can be assigned dynamically. Thus, seldom-used information can be stored as attributes and does not take up space as fields in the tables. Device related information is represented as attributes. For example, for projectors controlled by different serial ports, the serial port values can be represented as attributes. As another example, a universal resource locator (URL) associated with a service that represents a room can be represented as an attribute. For room object 220, device state object 250, and device object 260, FK1, FK2, and FK1, respectively, are associated pointers to attribute objects 270.

III. Component Configuration

Figure 3:
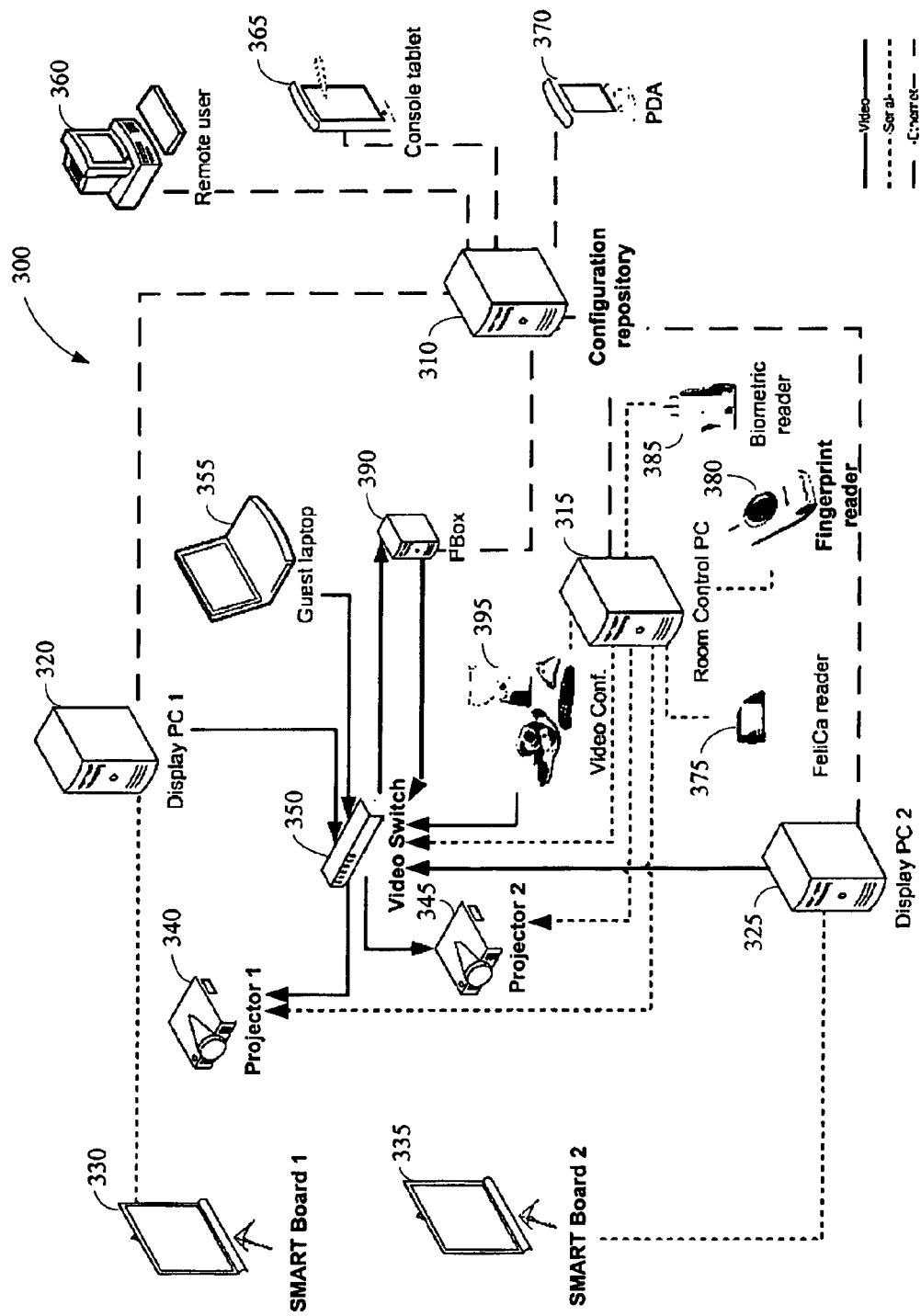
FIG. 3 illustrates an example diagram of the system logical components and their connections that correspond to the FIG. 1 software components, according to embodiments of the present invention.

FIG. 3 illustrates an example diagram of the system logical components and their connections that correspond to the FIG. 1 software components, according to embodiments of the present invention. These logical components are an exemplary subset of a room's available components, and can include other types of logical components not shown, as can be appreciated by one skilled in the art. These logical components include services that drive applications to control devices in a room, to perform authentication, and to perform configurations.

Although all software and hardware components of the system of the present invention can run on the same computer, typically the components are distributed among several machines, some of which can be co-located, while others can be remote. Thus the implementation of logical components and services is arbitrary.

Communication among components is mediated by web services calls, although other communications mechanisms such as Remote Procedure Call (RPC) or other custom protocols can also be used. Hardware components can be connected to each other using various methods, such as Video Graphics Array (VGA), Universal Serial Bus (USB), and Ethernet. In the example of FIG. 3, VGA connections are shown by a solid line. USB connections are shown by a line of small dashes. Ethernet connections are shown by a line of large dashes. The types and combinations of system connections shown in FIG. 3 are for illustrative purposes and are not limited to those shown in the figure. For example, a NTT video conferencing system uses telnet, whereas a Tandberg video conferencing system uses serial connection. As another example, other types of connections can be used that are not shown in FIG. 3.

FIG. 3 illustrates one hardware embodiment 300 of the system that includes a configuration repository 310, a room control personal computer (PC) 315, and two controllers, display PC 1 320 and display PC 2 325. Configuration repository 310 is a server that stores meeting configurations. For a configuration, someone specifies what configuration of meeting presenter, devices, applications, and documents should be used for a particular meeting in a particular room. One configuration repository can be shared among multiple rooms on a single network. For installations that include only one room, the room control PC 315 can store meeting configurations. For installations that include multiple conference rooms, one or more configuration repositories can be used. For one system installed in multiple geographic areas, and for meetings held in remote geographic areas, the configuration repository 310 could be replicated in these different geographic areas to avoid latency problems.

Display PCs 320 and 325 project displays onto corresponding SMART Board electronic whiteboards, SMART Board 1 330 and SMART Board 2 335, through corresponding overhead projectors, projector 1 340 and projector 2 345. The room control PC 315 can control the projectors 340 and 345 through a service that runs on that machine. Alternatively, display PCs 320 and 325 can control projectors 340 and 345, respectively. The room control PC 315 controls a video switch 350, which in turn controls the routing of displays, including guest laptops 355 that can be plugged into VGA cables in the room. The video switch can be used to select between several different video sources. The room control PC 315 can also control other functions, such as room lighting, audio, and air conditioning.

The system hardware 300 can be controlled by a user through any number of devices, such as a remote computer 360, a console tablet PC 365 and a personal digital assistant (PDA) 370, for example. Identification of users is performed through any number of user devices, such as a FeliCa badge reader 375 that uses RFID, a fingerprint reader 380, a biometric reader 385, an optical device (not shown), a magnetic card reader (not shown), and a cell phone (not shown), for example. Generally, the user console, or any of devices 360, 365, and 370, are connected to and control any of authentication devices 375, 380, and 385. Other machine can be connected to and control the authentication devices, however. For example, for an installation that includes one room, the room control PC 315 can be connected to and control the authentication devices. Generally, for each installation of the system, an authentication service that handles authentication of users only needs to reside on one server, and is typically co-located with the configuration repository. For an installation that includes only one room, the authentication service and configuration repository can reside on the room control PC 315.

Video conferencing devices 395, such as Tandberg, Sony, QUALCOMM, and NTT, can be used during video conference meetings. The video conferencing devices 395 are controlled through room control PC 315 through a service that runs on that machine. The PBox 390, or Projector Box, is a proprietary meeting capture and playback system. A video switch 350 has an output that mirrors the presentation that is input to it. This output is sent to the PBox 390 for future playback. Details of the Pbox 390 can be found in published U.S. patent application Ser. No. 10/973,698, entitled "SYSTEM AND METHOD FOR ACQUISITION AND STORAGE OF PRESENTATIONS," by Laurent Denoue, et al., filed Oct. 26, 2004.

More than one serial device and more than one TCP/IP device can be controlled simultaneously. Similarly, one or more applications can be run on each display PC for display PCs 320 and 325, such as SMART Boards 330 and 335. No dedicated remote control devices are required to operate the entire system, including system hardware 300 and system software 100. The any of devices 360, 365, and 370 can control the system regardless of what devices are used. Furthermore, the system can run autonomously, without control by the user at the user console, via a meeting configuration that includes settings to run the meeting autonomously on a certain date at a certain time.

The following description of the interaction between system components will discuss the system software components of FIG. 1 and the system logical components of FIG. 3, in conjunction with the database schema components of FIG. 2. References to "system" include components in FIGS. 1-3.

IV. Devices and Device States

The configuration repository 310 manages a database 105 of objects for meetings 210, rooms 220, configurations 230, creators 240, device states 250, devices 260, and attributes 270 for the database schema shown in FIG. 2. Each physical room can contain one or more devices, and each meeting involves the use of one or more configurations that orchestrate the use of some subset of the room's devices. A configuration object 230 represents devices by collecting a set of device state objects 250, each of which represents some device in a particular context. In the example of FIG. 3, a room can contain two identical projectors 340 and 345. The database 105 would contain one device object 260 that characterizes the type of projector of both 340 and 345. A meeting configuration would contain two device state objects 250, one for each of the projectors 340 and 345. The attributes of each DeviceState 225 would specify how the particular projector 340 and 345 should be connected to the system, including how it is connected to the video switch device 350, and what serial port should be used to control it.

V. Meetings

Each meeting is associated with at least one presenter, and each presenter is associated with a configuration. Any one of the presenters can start a meeting. Prior to starting a meeting, each presenter for the meeting configures his or her own portion of the meeting by selecting the room, devices, and applications that will be used, and by specifying which documents and contacts for video conferencing if any will be used during the meeting. Each room can have a default configuration, but each meeting can be customized over the configuration of the room. Through UIs 165, the presenter can use devices such as 360 in any location to access application logic 160 to schedule and configure meetings. After a presenter configures his or her own portion of the meeting, a configuration is saved in the configuration repository 310.

At the scheduled meeting time, supplied by one of the presenters in the meeting configuration, any of the users associated with the meeting can start the meeting using a UI 165. The users associated with the meeting may have to be authenticated by one of authentication devices 375, 380, or 385, according their respective configurations. Alternatively, the system can autonomously start at the scheduled meeting time. The system also has a preview mode with which any of the presenters can preview the meeting prior to the scheduled meeting time.

When the system is started, an orchestration component, also contained in the application logic 160, requests from the configuration repository 310 a configuration appropriate to the room or space being controlled, optionally the time of day, and optionally one of the presenters requesting to start a meeting. The information returned by the repository 310 is translated into a configuration for the meeting and is delivered to the room control service running on room control PC 315. If the meeting is associated with more than one configuration, then only one configuration is active at a time. During the meeting, presenters can dynamically select who will be presenting at any given time. The configuration includes a collection of device state objects 250 that describe how each device and application that participates in the meeting should be configured. This allows the system to put the devices into known states regardless of their earlier state. Thus, manual operation of devices, such as switching video sources or changing projector settings, for example, during gaps between meetings will not affect system behavior during a scheduled meeting. For example, if a presenter switches to a different video source, the system can automatically switch back to the original video source when the scheduled meeting resumes by using known state information in the original video source's device state object 250.

Figure 4:
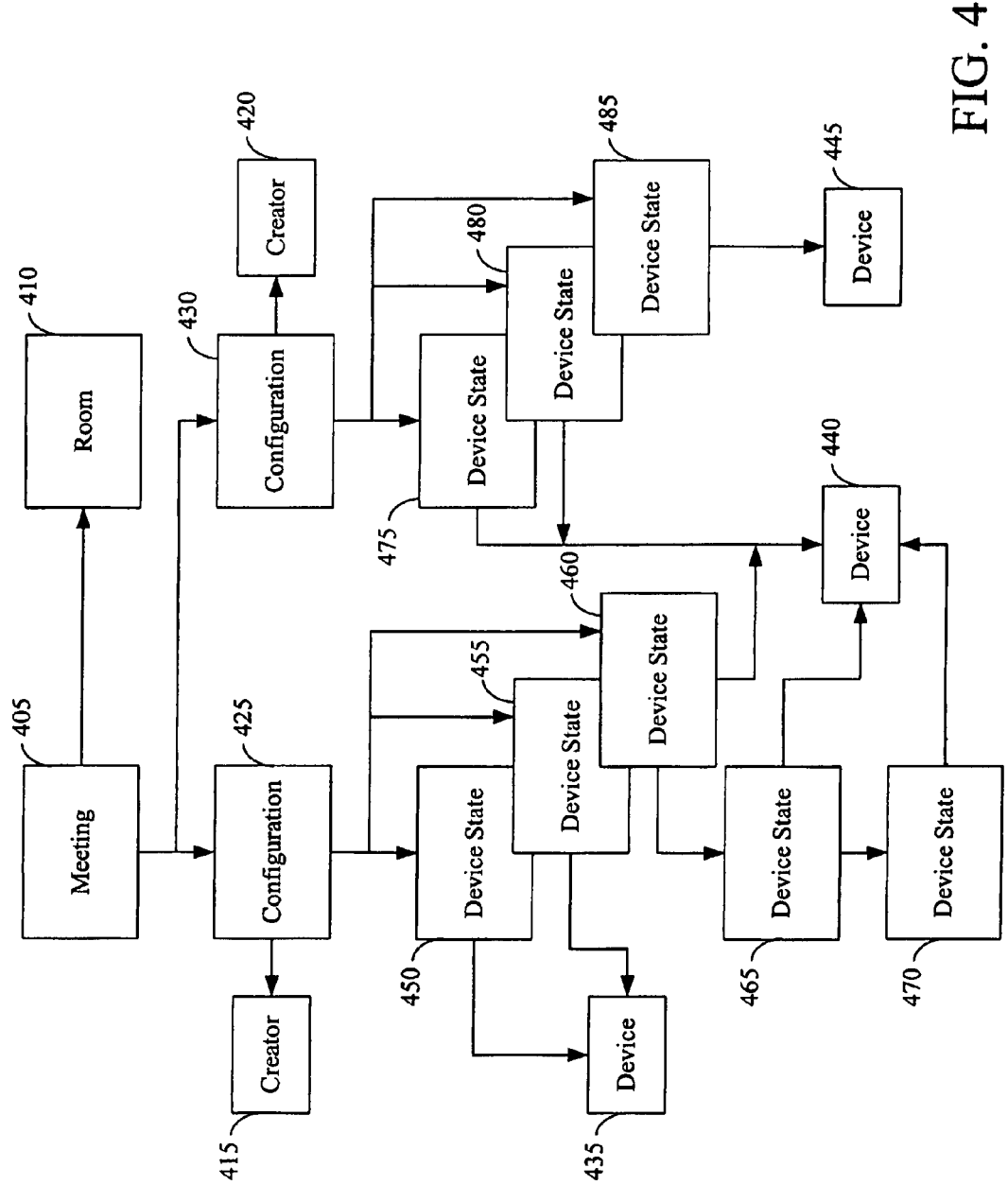
FIG. 4 illustrates an example of logical structure of a meeting configuration when a meeting starts, according to embodiments of the present invention.

FIG. 4 illustrates an example of logical structure of a meeting configuration when a meeting starts, according to embodiments of the present invention. The configuration repository 310 delivers this configuration to the room control service on room control PC 315, as discussed above. Example meeting, meeting 405 is scheduled to be held in room 410 on a certain date and at a certain time. Two creators 415 and 420, or presenters, will be presenting at the meeting and have created configurations 425 and 430. Each configuration is associated with three device states and two devices.

Configuration 425 has two devices 435 and 440 associated with it. An example of device 435 is a projector that has two device states 450 and 455 corresponding to projectors 340 and 345, respectively. For configuration 425, device 440 has one device state 460 associated with it. Device state 465 provides context for device state 460, and device state 470 provides context for device state 465.

Configuration 430 is also associated with device 440, as well as device 445. For configuration 430, device 440 has two device states 475 and 480 associated with it. Device states 475 and 480 are two different device states for the same device, device 440. Finally, device 445 has just one device state 485 associated with it in this example meeting configuration. An example device 445 is a video switch with just one device state 485 that corresponds to one instance of a video switch 350, as in FIG. 3.

VI. Devices in a Meeting

For each device state object 250 in the configuration associated with the meeting being started, a RoomControl component on the room control PC 315 will create an IDevice object to manage the device or application. IDevice is an interface through which the RoomControl interacts with all devices and applications, regardless of their purpose. These IDevice objects are the business objects 125, and the RoomControl component is contained in the application logic 160. Each IDevice has a unique identification (ID), implements initialization code described more fully below, and can execute commands. This interface makes the system extensible, as any new component that implements this interface can be added to the running system without requiring any changes to the orchestration component. The factory that creates objects can take as input a predefined logical object type, or a string that specifies the object class and the external library in which the class is defined. These specifications are passed in as attributes on device state objects 250. Since such libraries can be introduced at any time, objects can be added to the system dynamically, without requiring any recompiling or rebooting of any computers in the system. Thus it is possible to replace a physical device, for example one model of a projector 340 or 345 with another model, and update the configurations to control the new device by modifying one entry in the configuration repository 310 and by adding one file to the computer that runs the orchestration component.

Some interaction between devices is necessary. For example, the IDevice representing an application needs to know the IDevice that represents the display machine on which the application will run. The creation of IDevices, therefore, is a three-phase process.

Phase 1 includes creating a new instance of IDevice for each device state object 250 in the configuration. Typically, each implementation of IDevice will use attributes of the device state object 250 from which it is being created to populate its internal state. This often involves saving ID references to other IDevices that will be used in the operation of the IDevice being instantiated. Other parameters, such as serial port information, for example, can also be saved in this phase.

Phase 2 includes resolving references to the various IDevices. The IDs cached in phase 1 are used to find the IDevice instances and to store references to these IDevice instances.

Phase 3 includes executing the device code by the business objects 125 to put the devices into known states, and to launch applications, for example. This phase can be executed with a priority assigned to device state objects 250 in the configuration, so that, for example, applications start before the user console attempts to send them commands.

VII. Applications

Devices controlled by the system include serially-controlled devices such as example projectors 340 and 345, example video switch 350, and some example video conference devices 395, and network-controlled devices such as other computers 310, 315, 320, 325, and 390, for example. Applications such as PowerPoint that run on computers in the space being controlled also constitute devices to be orchestrated. Applications are controlled by a controller component on display PCs 320 and 325, also contained in the application logic 160. The controller component receives input from the orchestration component and selects the corresponding application for display to SMART Board 1 330 or SMART Board 2 335, for example. Multiple applications can be run simultaneously on each display machine, display PC 1 320 and display PC 2 325. The system places no restrictions of what kinds of applications can be run in this manner. Nor is the system limited to only two display PCs: any number of display PC can be configured into the system.

Each application can receive commands through the controller component. There are three classes of application in the system, which are system-specific applications, opaque applications, and applications with some automated control. An electronic whiteboard application is an example of a system-specific application. It can be controlled on a fine-grained level by injecting custom messages into its message queue. An opaque application, such as a Web browser, can be opened, closed, hidden, and displayed, but cannot be controlled in any custom way by the system. Finally, the third kind of application is one that has a published applications program interface (API) for controlling its execution. Power-Point, for example, has a COM API for advancing slides and performing other remote control actions. A special IDevice can be created for controlling PowerPoint programmatically. This allows presenters of the system to use a console, such as console tablet 365, to drive a presentation on a public display without physically interacting with the computer that controls the display, for example display PC 1 320 that controls display SMART Board 1 330. Thus, remote presenters to a space, as well as local presenters in a space, can make presentations to local audiences.

VIII. Interaction

The system's use of configurations allows much of the interaction with the system for control purposes to be reduced to a few simple selections, or to be entirely unnecessary.

One class of interactions involves logging into the system, controlled by the authentication and access control layer 140. A presenter can log in to the system with a badge that the presenter waves over or swipes through a FeliCa RFID reader 375, by using a fingerprint reader 380, or other biometric reader 385, or by typing a userid and password into a trusted application. A single swipe of a thumb or an RFID is sufficient to open a document or an electronic whiteboard application on one screen, such as SMART Board 1 330, and to initiate a teleconference call on another screen, such as SMART Board 2 335. In each example, the presenter focuses on the task, such as sketching, presenting, or communicating, rather than on the mechanics of controlling devices or figuring out which remote control to use.

Logging in is not strictly necessary, however. For example, picking up a pen to draw on an electronic white board automatically bootstraps the right applications and creates a context in which the results of the white board drawing can be saved permanently. Subsequently, if the presenter wants to save the data created in this ad hoc context, the presenter can log in and cause the data to be transferred to his or her personal space.

Once a presenter is logged in, the person does not need to use remote controls or buttons on the various devices of system to control the room. Most of the device states are configured automatically. The few cases where some input is required, for example choosing which telephone number or IP address to dial to establish a videoconference, can be accomplished with a single selection on a touch screen console used to control the room. The system automatically switches the projector 340 or 345 to video mode, determining the appropriate way to initiate the connection, and connecting to the remote site. This avoids one of the pitfalls of un-orchestrated spaces in which some devices can be left in unknown states, making it difficult to know what needs to be done to accomplish the desired task.

IX. System Hardware, Software and Components

Embodiments of the present invention can include computer-based methods and systems which can be implemented using a conventional general purpose or a specialized digital computer(s) or microprocessor(s), programmed according to the teachings of the present disclosure. Appropriate software coding can readily be prepared by programmers based on the teachings of the present disclosure. Embodiments of the present invention can include a program of instructions executable by a computer to perform any of the features presented herein.

Embodiments of the present invention can include a computer readable medium, such as a computer readable storage medium. The computer readable storage medium can have stored instructions which can be used to program a computer to perform any of the features presented herein. The storage medium can include, but is not limited to, any type of disk including floppy disks, optical discs, DVDs, CD-ROMs, microdrives, and magneto-optical disks, ROMs, RAMs, EPROMs, EEPROMs, DRAMs, flash memory or any media or device suitable for storing instructions and/or data. The present invention can include software for controlling both the hardware of a computer, such as a general purpose/specialized computer(s) or microprocessor(s), and for enabling them to interact with a human user or other mechanism utilizing the results of the present invention. Such software can include, but is not limited to, device drivers, operating systems, execution environments/containers, user interfaces, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. It is to be understood that other embodiments of the invention can be developed and fall within the spirit and scope of the invention and claims. The embodiments were chosen and described in order to best explain the principles of the invention and its practical application, thereby enabling others of ordinary skill in the relevant arts to understand the invention for various embodiments and with various modifications that are suited to the particular use contemplated. It is intended that the scope of the invention be defined by the following claims and their equivalents.

The entire disclosure of U.S. Provisional Patent Application 60/887,115 filed Jan. 29, 2007, including specification, claims, drawings, and abstract is incorporated herein by reference in its entirety.

What is claimed is:

1. A computer-based method for coordinating operation of hardware devices in a meeting, including:
   at a room control component residing on any of one or more computers connected by a network, each of the one or more computers including one or more processors, memory storing instructions, and at least one configuration repository component, wherein hardware devices are connected to the room control component:
      enabling one or more presenters to create a meeting configuration, each meeting configuration comprising one or more presenters' configurations of hardware devices, the meeting configuration being stored by the at least one configuration repository component, and each presenter's configuration comprising a plurality of device states for at least a subset of the hardware devices, each hardware device associated with one or more device states, each device state indicating a respective operation of an associated hardware device, a first device state of a first hardware device pointing to a second device state of a second hardware device; and
      following creation of the meeting configuration, coordinating the operation of the hardware devices for presentation in the meeting without control by the one or more presenters based on the one or more presenters' configurations for the meeting, wherein:
         enabling one or more presenters to create a meeting configuration includes authenticating one of the one or more presenters with a cell phone as an authentication device communicably connected to the room control component through authentication device wrappers for identifying the one of the one or more presenters, wherein the authentication device wrappers are configured to enable system independence from the choice of authentication devices in authenticating one of the one or more presenters; and
         coordinating the operation of hardware devices includes separately authenticating one of the one or more presenters with a cell phone as an authentication device communicably connected to the room control component through authentication device wrappers.

2. The computer-based method according to claim 1, further comprising coordinating the operation of software applications in support of the meeting configuration.

3. The computer-based method according to claim 1, wherein the hardware devices include at least one display machine for each room control component.

4. The computer-based method according to claim 1, wherein coordinating the operation of the hardware devices comprises enabling multiple presenters to present simultaneously.

5. The computer-based method according to claim 1, further comprising storing meeting information including meeting, room, presenter, configuration, hardware device, device state, and attribute information in one or more databases.

6. The computer-based method according to claim 5, wherein:
   the one or more databases comprise one of existing commercial databases, custom databases, and open source software; and
   the hardware devices comprise electronic white boards, video switchers, audio switchers, and video conference devices.

7. The computer-based method according to claim 5, wherein the one or more computers include a database abstraction layer to enable system independence from the choice of database in coordinating the operation of the hardware devices based on the one or more presenters' configurations for the meeting.

8. The computer-based method according to claim 1, wherein the meeting configuration comprises location, meeting type, user preferences, and the presence of remote participants.

9. A system for coordinating the operation of hardware devices in a meeting, the system comprising:
   one or more computers connected by a network;
   at least one configuration repository component, each configuration repository component residing on any of the one or more computers;
   at least one room control component, each room control component residing on any of the one or more computers;
   hardware devices for each room control component; and
   a memory storing instructions executable by the one or more computers, wherein the instructions include:
      instructions for creating a meeting configuration by one or more presenters, the meeting configuration comprising one or more presenters' configurations of hardware devices to accommodate multiple presenters, the meeting configuration being stored by the at least one configuration repository component, and each presenter's configuration comprising a plurality of device states for at least a subset of the hardware devices, each hardware device associated with one or more device states, each device state indicating a respective operation of an associated hardware device, a first device state of a first hardware device pointing to a second device state of a second hardware device; and
      instructions for, following creation of the meeting configuration, coordinating the operation of the hardware devices for presentation in the meeting without control by the one or more presenters based on the one or more presenters' configurations for the meeting, wherein:
         the instructions for creating a meeting by one or more presenters include instructions for authenticating one of the one or more presenters with a cell phone as an authentication device communicably connected to the at least one room control component through authentication device wrappers for identifying the one of the one or more presenters, wherein the authentication device wrappers are configured to enable system independence from the choice of authentication devices in authenticating one of the one or more presenters; and
         the instructions for coordinating the operation of hardware devices include instructions for separately authenticating one of the one or more presenters with a cell phone as an authentication device communicably connected to the room control component through authentication device wrappers.

10. The system according to claim 9, wherein the system coordinates the operation of software applications in support of the meeting configuration.

11. The system according to claim 9, further comprising at least one display machine for each room control component.

12. The system according to claim 9, wherein coordinating the operation of the hardware devices comprises enabling multiple presenters to present simultaneously.

13. A system according to claim 9, further comprising databases that store meeting information including meeting, room, presenter, configuration, hardware device, device state, and attribute information.

14. The system according to claim 13, wherein:
the databases comprise one of existing commercial databases, custom databases, and open source software; and
the hardware devices comprise electronic white boards, video switchers, audio switchers, and video conference devices.

15. The system according to claim 13, further comprising a database abstraction layer to enable system independence from the choice of databases in coordinating the operation of the hardware devices by the room control component based on the one or more presenters' configurations for the meeting.

16. The system according to claim 9, wherein the meeting configuration comprises location, meeting type, user preferences, and the presence of remote participants.

17. A non-transitory computer readable storage medium storing one or more programs for execution by one or more processors at one or more computers connected by a network, wherein the one or more computers include at least one room control component and at least one configuration repository component, and hardware devices are connected to the at least one room control component, the one or more programs comprising instructions for:
enabling one or more presenters to create a meeting configuration, each meeting configuration comprising one or more presenters' configurations of hardware devices, the meeting configuration being stored by the at least one configuration repository component, and each presenter's configuration comprising a plurality of device states for at least a subset of the hardware devices, each hardware device associated with one or more device states, each device state indicating a respective operation of an associated hardware device, a first device state of a first hardware device pointing to a second device state of a second hardware device; and
following creation of the meeting configuration, coordinating the operation of the hardware devices for presentation in the meeting without control by the one or more presenters based on the one or more presenters' configurations for the meeting, wherein:
the instructions for enabling one or more presenters to configure a meeting include instructions for authenticating one of the one or more presenters with a cell phone as an authentication device communicably connected to the at least one room control component through authentication device wrappers for identifying the one of the one or more presenters, wherein the authentication device wrappers are configured to enable system independence from the choice of authentication devices in authenticating one of the one or more presenters; and
the instructions for coordinating the operation of hardware devices includes separately authenticating one of the one or more presenters with a cell phone as an authentication device communicably connected to the room control component through authentication device wrappers.

18. The computer-based method according to claim 1, wherein the enabling and the coordinating both comprise first authenticating one of the one or more presenters with authentication devices for identifying the one of the one or more presenters, wherein the authentication devices comprise a radio frequency identification (RFID) reader, and a biometric reader.

19. The computer-based method according to claim 1, wherein enabling one or more presenters to create a meeting configuration includes enabling a plurality of users to create the meeting configuration simultaneously.

20. The system according to claim 9, wherein:
the instructions for enabling comprise instructions for authenticating one of the one or more presenters with authentication devices for identifying the one of the one or more presenters, wherein the authentication devices comprise a radio frequency identification (RFID) reader, and a biometric reader.

21. The system according to claim 9, wherein enabling one or more presenters to create a meeting configuration includes enabling a plurality of users to create the meeting configuration simultaneously.

22. The method of claim 1, wherein the second device state of the second hardware device points to a third device state of a third hardware device.

23. A computer-based method for coordinating operation of hardware devices in a meeting, comprising:
at a room control component residing on any of one or more computers connected by a network, each of the one or more computers including one or more processors and memory storing instructions, wherein the hardware devices are connected to and coordinated via the network:
enabling one or more presenters to create and store a plurality of meeting configurations of the hardware devices, each meeting configuration comprising one or more presenters' configurations of hardware devices, the meeting configurations including a first meeting and a second meeting configuration created by using inheritance from the first meeting configuration; and
following creation of the meeting configuration, coordinating the operation of the hardware devices for presentation in the meeting without control by the one or more presenters based on the one or more presenters' meeting configurations, wherein:
enabling one or more presenters to create and store a plurality of meeting configurations includes authenticating one of the one or more presenters with a cell phone as an authentication device communicably connected to the room control component through authentication device wrappers for identifying the one of the one or more presenters, wherein the authentication device wrappers are configured to enable system independence from the choice of authentication devices in authenticating one of the one or more presenters; and
coordinating the operation of hardware devices includes separately authenticating one of the one or more presenters with a cell phone as an authentication device communicably connected to the room control component through authentication device wrappers.

24. The method of claim 23, wherein:
each of the hardware devices is associated with a plurality of device states;
each of the meeting configurations includes a plurality of the device states for at least a subset of the hardware devices;
each of the device states has an associated record in a device state table, the device state table including a first device state object associated with a first device state and a second device state object associated with a second device state pointed to by the first device state object; and
the meeting configurations include a first meeting configuration associated with the first device state and a second meeting configuration associated with the second device state, such that the second meeting configuration is created by using inheritance from the first meeting configuration based on the second device state object pointing to the first device state object.

25. A system for coordinating the operation of hardware devices in a meeting, the system comprising:
one or more computers connected by a network;
at least one configuration repository component, each configuration repository component residing on any of the one or more computers;
at least one room control component, each room control component residing on any of the one or more computers;
one or more hardware devices for each room control component; and
a memory storing instructions executable by the one or more computers, wherein the instructions include:
instructions for creating a meeting configuration by one or more presenters, the meeting configurations including a first meeting and a second meeting configuration created by using inheritance from the first meeting configuration; and
instructions for, following creation of the meeting configuration, coordinating the operation of the hardware devices for presentation in the meeting without control by the one or more presenters based on the one or more presenters' configurations for the meeting, wherein:
the instructions for creating a meeting configuration by one or more presenters includes instructions for authenticating one of the one or more presenters with a cell phone as an authentication device communicably connected to the room control component through authentication device wrappers for identifying the one of the one or more presenters, wherein the authentication device wrappers are configured to enable system independence from the choice of authentication devices in authenticating one of the one or more presenters; and
the instructions for coordinating the operation of hardware devices include instructions for separately authenticating one of the one or more presenters with a cell phone as an authentication device communicably connected to the room control component through authentication device wrappers.

26. A non-transitory computer readable storage medium storing one or more programs for execution by one or more processors at one or more computers connected by a network, wherein the one or more computers include at least one room control component and at least one configuration repository component, and one or more hardware devices are connected to the respective room control component, the one or more programs comprising instructions for:
enabling one or more presenters to create and store a plurality of meeting configurations of the hardware devices, each meeting configuration comprising one or more presenters' configurations of hardware devices, the meeting configurations including a first meeting and a second meeting configuration created by using inheritance from the first meeting configuration; and
following creation of the meeting configuration, coordinating the operation of the hardware devices for presentation in the meeting without control by the one or more presenters based on the one or more presenters' meeting configurations, wherein:
enabling one or more presenters to create and store a plurality of meeting configurations includes authenticating one of the one or more presenters with a cell phone as an authentication device communicably connected to the room control component through authentication device wrappers for identifying the one of the one or more presenters, wherein the authentication device wrappers are configured to enable system independence from the choice of authentication devices in authenticating one of the one or more presenters; and
coordinating the operation of hardware devices includes separately authenticating one of the one or more presenters with a cell phone as an authentication device communicably connected to the room control component through authentication device wrappers.

* * * * *